United States Patent [19]
Field

[11] 3,783,416
[45] Jan. 1, 1974

[54] SOLID ULTRASONIC DELAY LINES AND GLASS COMPOSITIONS THEREFOR

[75] Inventor: Marshall Field, Toledo, Ohio

[73] Assignee: Owens Illinois, Inc., Toledo, Ohio

[22] Filed: July 6, 1971

[21] Appl. No.: 160,164

Related U.S. Application Data

[62] Division of Ser. No. 887,264, Dec. 22, 1969.

[52] U.S. Cl.................. 333/30 R, 106/52, 106/53
[51] Int. Cl. ....... H03h 7/30, C03c 3/30, C03c 3/10
[58] Field of Search............................... 106/52, 53

[56] References Cited
UNITED STATES PATENTS

| | | | |
|---|---|---|---|
| 3,154,425 | 10/1964 | Hoover et al. | 106/53 |
| 3,598,619 | 8/1971 | Mikoda et al. | 106/53 |
| 3,651,431 | 3/1972 | Krause | 106/53 |
| 3,669,697 | 6/1972 | Drake | 106/53 |
| 3,672,921 | 6/1972 | Asahara et al. | 106/53 |
| 3,687,697 | 8/1972 | Faulstich et al. | 106/53 |
| 3,296,561 | 1/1967 | Polucci | 333/30 R |
| 2,663,006 | 12/1953 | Anderson | 333/30 R |
| 3,496,401 | 2/1970 | Dumbaugh, Jr. | 106/52 |
| 3,402,055 | 9/1968 | Harris et al. | 106/52 |

FOREIGN PATENTS OR APPLICATIONS

| | | | |
|---|---|---|---|
| 2,005,676 | 12/1969 | France | 106/53 |

Primary Examiner—A. B. Curtis
Assistant Examiner—Mark Bell
Attorney—Richard D. Heberling

[57] ABSTRACT

Solid ultrasonic delay lines are provided including an input transducer for converting electrical energy to acoustical energy, an output transducer for converting the acoustical energy to electric energy, and a glass delay line medium located therebetween as a delay line, the glass having a composition comprising the following ingredients in approximate molar amounts:

| TI INGREDIENTS | TN MOLES |
|---|---|
| $SiO_2$ | 3.55 to 6.0 |
| $Al_2O_3$ | 1 |
| RO | 1 | where R is a divalent metal such as magnesium, cadmium and lead.

4 Claims, 2 Drawing Figures

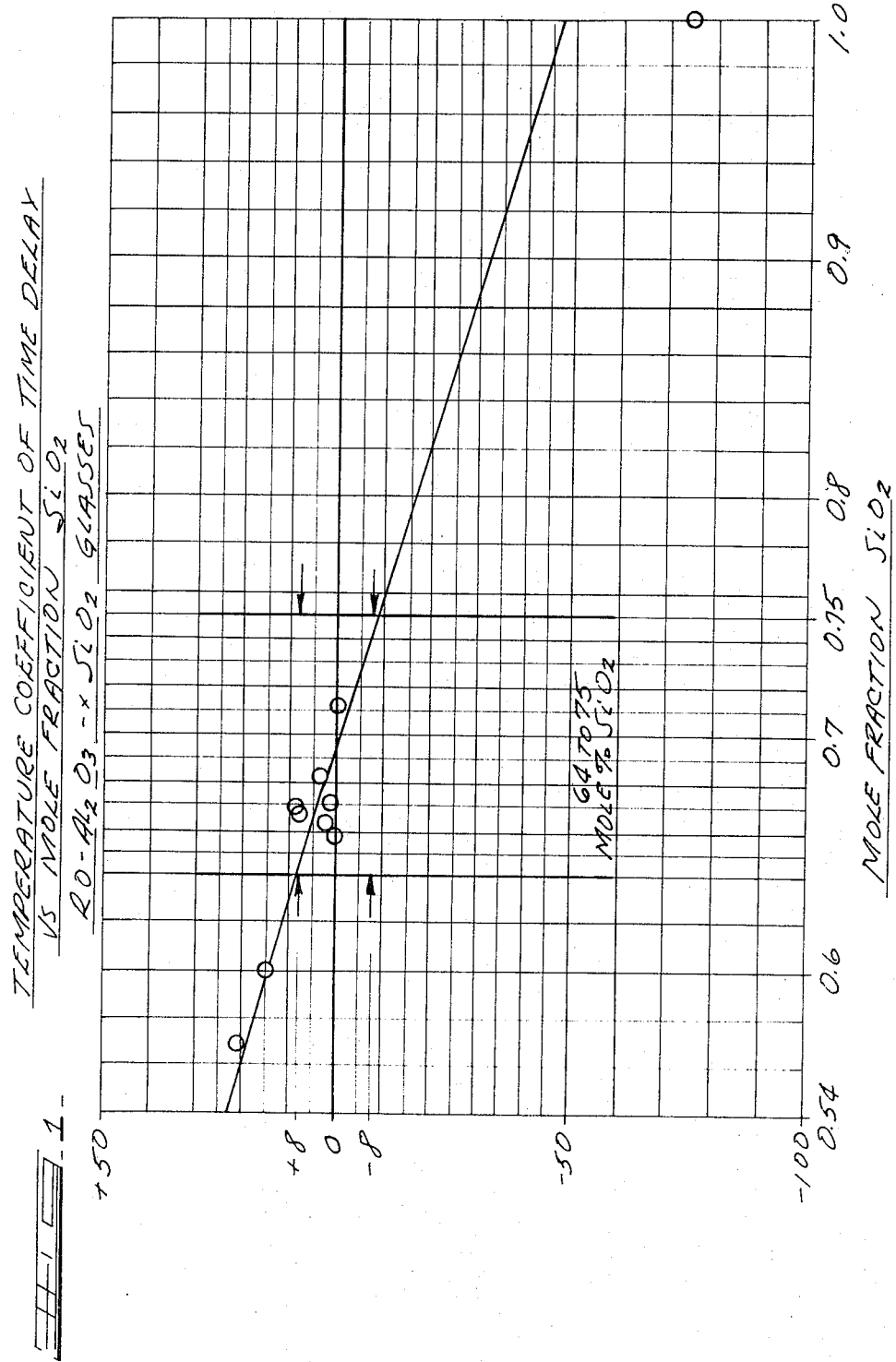

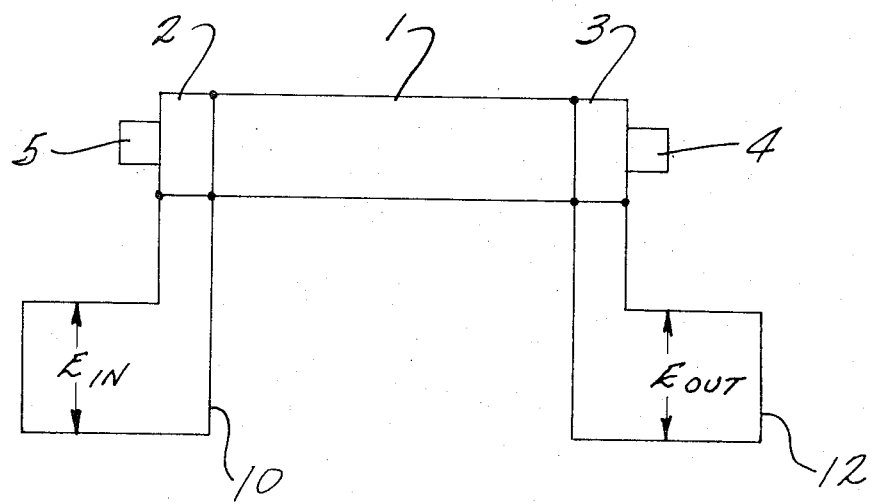

SOLID ULTRASONIC DELAY LINES AND GLASS COMPOSITIONS THEREFOR

The present application is a division of application S.N. 887,264 filed Dec. 22, 1969, now abandoned.

THE INVENTION

The present invention relates to solid ultrasonic delay lines that include a glass delay line medium located between an input transducer for converting electrical energy to acoustic energy and an output transducer for converting acoustic energy to electrical energy. The invention more particularly relates to an ultrasonic delay line with an aluminosilicate glass delay line medium located between the input transducer and the output transducer.

In the past, alkali-lead-silicate glass composition delay line mediums have been used in ultrasonic delay lines, but such compositions have been difficult to melt and have not been as stable in regard to temperature and time as desired for most applications.

It is an object of the present invention to provide an ultrasonic delay line having an acoustic aluminosilicate glass delay line medium located between an input transducer for converting electrical energy to acoustic energy and an output transducer for converting acoustic energy to electrical energy.

It is an object of the present invention to provide an ultrasonic delay line having a glass delay line medium in which the glass composition comprises about 1 mole of $Al_2O_3$, 1 mole of RO, where R is a divalent metal, and about 3.55 to 6.0 moles of $SiO_2$.

It is an object of the present invention to provide a glass composition for use as a time delay medium in a solid ultrasonic delay line, the composition being stable with respect to time and temperature, easy to melt and form, and having the following ingredients in approximate molar amounts:

| Ingredients | Moles |
|---|---|
| $SiO_2$ | 3.55 to 6.0 |
| $Al_2O_3$ | 1 |
| RO | 1 | where RO is a divalent metal oxide.

These and other objects will be apparent from the description that follows, the appended claims and the drawings in which:

FIG. 1 is a graph plotting the temperature coefficient of time delay versus the amount of $SiO_2$ expressed in mole fraction of the total composition showing glass compositions having coefficients of time delays within $\pm 8$ ppm/°C.

FIG. 2 is a schematic view of a delay line assembly employing the glass delay line medium according to the present invention.

As seen in the drawings, a solid ultrasonic delay line assembly includes a glass delay line medium 1, an input transducer 2 for converting electrical energy to acoustic energy, an output transducer 3 for converting acoustic energy to electrical energy, an electrical input circuit 10 with an electrical potential of $E_{in}$ volts, and an electrical signal output circuit 12 with an electrical potential of $E_{out}$ volts. The glass medium can be a rod or flat polygonal plate or other shape that will transmit the acoustic signal after a desired (delay) time in a desired delayed time interval.

The present invention provides a solid ultrasonic delay line comprising an input transducer for converting electrical energy to acoustic energy, an output transducer for converting acoustic energy to electrical energy, and a glass delay line medium located therebetween, the glass being an aluminosilicate containing about 1 mole of $Al_2O_3$, 1 mole of RO where R is a divalent metal, and about 3.55 to 6.0 moles of $SiO_2$.

On a molar basis, the formula for the glasses of the invention can be written: $xRO \cdot yAl_2O_3 \cdot zSiO_2$ where $x/y = 1$ and $z/x+y+z \approx 0.64$ to $0.75$.

The present invention provides a solid glass ultrasonic delay line composition, the glass composition being stable, easy to melt and form. The glass delay line medium is used in solid ultrasonic delay lines for television sets, television transmitting studies, small computers, radar range markers (as calibration for use in ships and aircraft) and as memories for oscilloscopes. In addition to being very stable from the time and thermal stability standpoint, the glass delay line medium has other valuable properties that are needed for good ultrasonic delay lines such as low velocity of sound within the medium, low density, excellent small temperature coefficients of time delay in the critical temperature region and a small attenuation (loss factor).

The velocity of sound generally is less than about 3.9 mm/$\mu$ sec and preferably about 2.99 to 3.6 mm/$\mu$sec. The density is generally about 2.3 to 2.8 gm/cc and preferably about 2.5 gm/cc. The attenuation A is low, being low enough for computer memories and low enough for television sets--being less than 1 db/cm at 20 MHZ. The attenuation usually is in the range of less than about 1.2 to 0.9 decibels per centimeter at 20 MHZ. As previously indicated, the temperature coefficients of time delay and the attenuation are also low--being preferably less than about 3 ppm/°C. and less than about 1 db/cm, respectively. The outstanding compositions of the present invention have excellent temperature coefficients of time delay and as seen in FIG. 1, the amount of $SiO_2$ in mole fraction of the total composition is shown in compositions that provide a certain coefficient of time delay within a $\pm 8$ ppm/°C.

By the use of the time delay glass compositions of the present invention, it is possible to predict and control the temperature coefficient of time delay of the systems over wide ranges of composition. Materials with zero time coefficients of delay can be produced. Advantageously, the glass compositions are easy to form and work with. The densities and delay times can be tailored from the compositions and the compositions can be tailored also to specific criteria of delay time and attenuation.

In the above-described time delay compositions, R is a divalent metal which is preferably an alkaline earth metal such as Mg or Ca. Other metals can be used as R such as Cd, Pb, Fe, Ba and mixtures thereof such as mixtures of Mg and Fe and mixtures of Mg and Ba.

The following examples are intended to illustrate the present invention and not to limit the same.

EXAMPLE

A series of aluminosilicate glasses was prepared with varied amounts and kinds of RO oxides. The following glasses were prepared with the oxide content being given in mole percent:

TABLE I

| Glass No. | RO | R'O | $Al_2O_3$ | $SiO_2$ | Density gm/cm³ |
|---|---|---|---|---|---|
| 1 | Mn: 17.731 | | 15.284 | 66.985 | 2.6864 |

| | | | | | |
|---|---|---|---|---|---|
| 2 | Pb: 17.39 | | 16.743 | 65.867 | 3.4538 |
| 3 | Mg: 8.528 | Ba: 8.396 | 16.719 | 66.356 | 2.7613 |
| 4 | Mg: 16.752 | Bi: 8.274 | 8.465 | 66.508 | 3.5512 |
| 5 | Ca: 16.575 | | 16.800 | 66.625 | 2.5431 |
| 6 | Cd: 10.803 | | 17.944 | 71.253 | 2.7725 |
| 7 | Mg: 8.672 | FeO: 6.083 | 17.014 | 67.137 | 2.5925 |
| | | Fe$_2$O$_3$: 1.095 | | | |

In the above Table, R and R' are divalent metals.

Another glass, No. 8, which was a potassium-lead-silicate was also prepared, it having the following composition: K$_2$O 8.1 weight percent, PbO 43.9 weight percent, SiO$_2$ 47.7 weight percent.

The above materials labeled glass Nos. 1–8 were formed into small cubes and tested, the results which are as follows:

TABLE II

20 mHz Shear Ultrasonic Data

| Glass No. | $(1/\tau_{25})(d\tau/dT)$ (ppm/°C.) | A(db/cm) | $v$shear (25°) mm/μsec | Cation |
|---|---|---|---|---|
| 1 | 9.31 | 1.30 | 3.6501 | Mn |
| 5 | 8.14 | 1.04 | 3.7018 | Ca |
| 3 | 2.54 | 1.18 | 3.5309 | Mg, Ba |
| 7 | 1.53 | 0.89 | 3.8106 | Mg, Fe |
| 2 | 0.52 | 1.52 | 2.9914 | Pb |
| 6 | ~0 | 1.01 | 3.5636 | Cd |
| 8 | 3.4 | 1.16 | 2.4733 | K |

The best results were obtained with glasses 3, 6 and 7 which illustrate highly preferred time delay compositions of the present invention.

The above table indicates that glasses 2, 3, 6 and 7 have some properties equal to or superior to those of alkali lead silicate glasses presently used for this purpose. The above properties were measured between 24° and 75°C., the temperatures commonly encountered in electronic devices. The term 20 MHZ refers to an electrical or elastic wave oscillation frequency of 20 × 10$^6$ (sec)$^{-1}$. "Shear" means a transverse elastic wave. These waves are generated by crystals such as AC cut crystalline quartz when excited with an electric field. The term shear refers to the velocity of shear waves travelling within the sample. This quantity was measured using McSkimin's pulse-echo technique. A in decibel per centimeter is measured as 20 times the logarithm of the ratio of the heights of adjacent pulses in the medium divided by the distance traveled, i.e., $$A = 1/l \cdot 20 \log V_0/V_1$$

where $V_0$ is the original pulse-height and $V_1$ is the height of the pulse that has traveled $l$ centimeters through the delay medium. The temperature coefficient of time delay is herein designated:

$$1/\tau 25 \; d\tau/dT$$

and is defined as:

$$1/\tau 25 \; d\tau/dT = 1/\tau(25°C.) \, [\tau(T) - \tau(25°C.)/T - 25].$$

The last glass, No. 8, was a control glass which represents a potassium-lead-silicate glass of the prior art. The glasses of the present invention have the general composition RO·Al$_2$O$_3$·xSiO$_2$ where $x$ generally is about 3.55 to 6 mole and preferably 4.45 to 4.9 moles and such glasses provide outstanding time delay mediums which exhibit (1) exceptionally good temperature and temporal stability, (2) low density, (3) moderate thermal expansion coefficients, (4) acceptable forming properties, and (5) good glass quality substantially free from defects such as seeds.

What is claimed is:

1. A solid ultrasonic delay line comprising an input transducer for converting electrical energy to acoustic energy, an output transducer for converting acoustic energy to electrical energy, and a glass delay line medium located therebetween as a delay line, the glass having a coefficient of time delay of less than ± 8 ppm/°C. and attenuation less than about 1.2 db/cm at 20MHZ, and having a composition consisting essentially of the following ingredients in approximate molar amounts:

| Ingredients | Moles |
|---|---|
| SiO$_2$ | 3.55 to 6.0 |
| Al$_2$O$_3$ | 1 |
| RO | 1 | where R is a divalent metal selected from Mg, Ba, Fe or mixtures thereof.

2. A delay line as defined in claim 1 in which the R is an alkaline earth metal.

3. A delay line as defined in claim 1 in which R is Mg.

4. A delay line as defined in claim 1 in which the amount of SiO$_2$ in the glass composition is about 4.45 to 4.9 moles.

* * * * *